US006230145B1

(12) United States Patent
Verderamo et al.

(10) Patent No.: US 6,230,145 B1
(45) Date of Patent: May 8, 2001

(54) METHOD FOR PROVIDING BANK CARD TRANSACTION DATA

(75) Inventors: Richard James Verderamo, Monkton, MD (US); Jonathan Michael Cannon, Dover, PA (US)

(73) Assignee: First Data Corporation, Hackensack, NJ (US)

( * ) Notice: Subject to any disclaimer, the term of this patent is extended or adjusted under 35 U.S.C. 154(b) by 0 days.

(21) Appl. No.: 09/185,877

(22) Filed: Nov. 3, 1998

(51) Int. Cl.[7] ........................................... G06F 17/60
(52) U.S. Cl. ............................ 705/35; 705/39; 705/40
(58) Field of Search .................................. 705/1, 26, 29, 705/30, 34, 35, 39, 40

(56) References Cited

U.S. PATENT DOCUMENTS 5,963,925 * 10/1999 Kolling et al. ......................... 705/27

OTHER PUBLICATIONS

"American Express's New Online Service for Merchants," Credit Card News, May 1, 1996, p. 3.*
"The Real Credit is Innovation: Savvy Credit Card Companies, Alomg With Issuers and Processors, Offer Cybertools to Aid in Marketing and Customer Service as well as Accounting," Nation's Restaurant News, vol. 34, No. 44, Nov. 3, 1997.*
"Meet the 'Coopetition'," Credit Card Management, Jun., 1997, p. 12.*
"Vital Introduces First Standards–Based Internet Commerce Payment Gateway Service," PR Newswire, Sep. 14, 1998.*
"Checking AmEx Balances Via the Web," Newsbytes, Apr. 30, 1997.*
"Merchants Can Track Purchases By Modem (Abstract)", DM News, Dec. 2, 1996.*

* cited by examiner

Primary Examiner—Vincent Millin
Assistant Examiner—Jagdish N Patel
(74) Attorney, Agent, or Firm—Brooks & Kushman P.C.

(57) ABSTRACT

A method of providing bank transaction data for a merchant via the Internet includes displaying on a computer connected to a host a graphical user interface having a plurality of payment services categories. Each of the payment services categories is associated with a processing function performed by the host. One of the payment services categories is then selected. A graphical user interface having links associated with the selected one of the payment services categories is then displayed on the computer. One of the links is then selected. A graphical user interface having entry boxes associated with the selected one of the links is then displayed on the computer. Requested information is then entered into the entry boxes. The requested information entered into the entry boxes is then processed at the host. A graphical user interface having bank card transaction data associated with the processed requested information is then displayed on the computer.

1 Claim, 22 Drawing Sheets

Download Personal Security Certificate

This personal certificate is another of Moneta's state of the art security features. Once you have downloaded the certificate, this security feature is enabled automatically every time you log onto Moneta.

40

Click the "Generate' button and follow the instructions to continue.

512 (Low Grade)

Generate

Public Key and Request Certificate

FIG. 5

Download Personal Security Certificate

The next step in the process is to download your new Personal Certificate used to access Moneta. Please proceed through all of the steps to accept the certificate into your browser. Then you will be able to enter Moneta.

50

1. Download Personal Certificate
2. Enter Moneta

If you have any problems downloading your certificate, please call our Moneta Response Center Desk at 1-800-272-7220.

FIG. 6

Welcome to

Moneta

60

Please type in your User ID and Password to login.

Your User ID: GUEST

Your Password: * * * *

Submit

In order to view this site, you must use a frames-capable browser.
This site is best viewed with Netscape Communicator.
Download Netscape Now!

FIG. 7

Search by:
Merchant Number [111222333999]
Merchant Name [                ] ← 70

Fill in one of the above fields and

– OR –

Fill in no search criteria and simply
view all merchant outlets.

Please select a merchant from the list or select new search criteria.

| Merchant # | Name | Address |
|---|---|---|
| 111222333999 | #99 SAMPLE OUTLET | ANY TOWN, US |

80

84

Retrieve information on another merchant.

Corp # 444555666999 / SAMPLE CORPORATION

92

Sales & Funding — 98
- Funding Information — 100
- Daily Funding Information — 102
- Monthly Sales History — 104
- Point of Sales Information — 106
- Rejected Transactions List
- Cardholder Transaction Inquiry — 108

Reports — 94
- Outlet Statements — 110

Chargebacks — 96
- Chargeback List — 112
- Chargeback Statistics — 114
- Customer Chargeback Detail — 116

Media Retrieval — 96
- Media Retrieval List — 118
- Media Retrieval Statistics — 120

○ Owner
○ Bank
○ Agent
○ Corporate
　　Chain
　　Outlet

Retrieve information on another merchant.

FIG. 10

▷ 1. account selection
       2. Date Selection        ← 130
       3. Transfers
       4. Financial Summary
       5. Detail Corp # 444555666999 / SAMPLE CORPORATION Please select an account to see more information:

| 1 Items (1-1) | click here to download spreadsheet version of this data | | |
|---|---|---|---|
| | Bank Account # | ABA# | Funding Agency |
| 1. | 00001122334455667 | 011223344 | A BANK |

Retrieve information on another merchant.

1. Account Selection    Bank Account #: 00001122334455667
    ▷ 2. date selection
       3. Transfers
       4. Financial Summary
       5. Detail             *(Only with Detail/Net Transfers)*

Corp # 444555666999 / SAMPLE CORPORATION

Please select a date to see a list of transfers (within a 6 month period):

From: | September | | 08 | | 1998 |
To: | October | | 08 | | 1998 | [Submit]

Retrieve information on another merchant.

FIG. 12

▷ 1. date selection                ← 180
       2. Transfers
       3. Financial Summary    *(Only for Accounts with Transfers)*
       4. Detail                *(Only with Detail/Net Transfers)*

Corp # 444555666999 / SAMPLE CORPORATION

Please select a date to see a list of transfers (within a 6 month period):

Date: | October | | 08 | | 1998 | [Submit]

Retrieve information on another merchant.

1. Account Selection    *Bank Account #: 00001122334455667*
2. Date Selection    *09/08/1998 - 10/08/1998*
▷ 3. transfers
4. Financial Summary
5. Detail    *(Only with Detail/Net Transfer)*

Corp # 444555666999 / SAMPLE CORPORATION

Transfers funded to outlet. Please select a date for more detail:

| 9 Items (1-9) | | click here to download spreadsheet version of this data | | |
|---|---|---|---|---|
| Item | Date | Amount | Transfers | Funding Mode |
| 1. | 10/08/1998 | 13,724.93+ | 1 | Net Transfer |
| 2. | 10/02/1998 | 1,399.55- | 2 | Net Transfer |
| 3. | 10/02/1998 | 799.11- | 2 | Net Transfer |
| 4. | 9/28/1998 | 17,214.09+ | 1 | Net Transfer |
| 5. | 9/23/1998 | 75,294.78+ | 1 | Category Transfer |
| 6. | 9/23/1998 | 101,573.98+ | 1 | Net Transfer |
| 7. | 9/21/1998 | 58,905.39+ | 1 | Net Transfer |
| 8. | 9/10/1998 | 19,395.59+ | 1 | Net Transfer |
| 9. | 9/10/1998 | 100,444.69+ | 1 | Net Transfer |

Retrieve information on another merchant.

1. Account Selection    *Bank Account #: 00001122334455667*
2. Date Selection    *09/08/1998 - 10/08/1998*
3. Transfers    *10/08/1998 - Net Transfer*
4. Financial Summary    *VISA_ DEPOSITS*
▷ 5. detail Corp # 444555666999 / SAMPLE CORPORATION

| 1 Item(s) | | click here to download spreadsheet version of this data | | | |
|---|---|---|---|---|---|
| | Merchant # | Date | Reference # | Description | Amount |
| 1. | 367589201991 | 10/08/1998 | 000000000001 | VISA | 11,584.01+ |
| | | | | TOTAL: | 11,584.01+ |

Retrieve information on another merchant.

1. Account Selection    Bank Account #: 00001122334455667
2. Date Selection    09/08/1998 - 10/08/1998
3. Transfers    10/08/1998 - Net Transfer
▷ 4. financial summary
5. Detail Corp # 444555666999 / SAMPLE CORPORATION Please select a line item for more detail:

| Financial Categories | Credits | Debits | Sub-Totals |
|---|---|---|---|
| click here to download spreadsheet version of this data ||||
| DEPOSITS ||||
| 1. VISA - DEPOSITS | 11,584.01 | | |
| 2. ALL DEBIT CARDS - DEPOSITS | 702.57 | | |
| 3. MASTERCARD - DEPOSITS | 1,503.45 | | |
| INTERCHANGE/ASSESSMENT | | | 13,790.03+ |
| 4. MASTERCARD - BILLBACK | | 2.37 | |
| 5. VISA - BILLBACK | | 3.00 | |
| | | | 5.37- |
| DISCOUNT/SERVICE CHARGE ||||
| 6. MASTERCARD - DISCOUNT/SERVICE CHARGE | | 12.46 | |
| 7. VISA - DISCOUNT/SERVICE CHARGE | | 45.29 | |
| | | | 57.75- |
| FEES ||||
| 8. ALL DEBIT CARDS - AUTHORIZATIONS | | 0.57 | |
| 9. ALL DEBIT CARD - DATA CAPTURE | | 0.98 | |
| 10. MASTERCARD - FOREIGN HANDLING | | 0.09 | |
| 11. VISA - FOREIGN HANDLING | | 0.34 | |
| | | | 01.98- |
| | | TOTAL: | 13,724.93+ |

Retrieve information on another merchant.

FIG. 14

1. Date Selection   10/08/1998   ← 190
▷ 2. transfers
3. Financial Summary   (Only for Accounts with Transfers)
4. Detail   (Only with Detail/Net Transfers)

Corp # 444555666999 / SAMPLE CORPORATION

Transfers funded to outlet. Please select a date for more detail:

| 1 Items (1-1) | | click here to download spreadsheet version of this data | | | | |
|---|---|---|---|---|---|---|
| Item: | Bank Account # | ABA # | Funding Agency | Amount | Transfers | Funding Mode |
| 1. | 00001122334455667 | 011223344 | A BANK | 1,121.60+ | | Net Transfer |
| | | | Total: | 1,121.60+ | | |

192   Retrieve information on another merchant.

FIG. 17

1. Date Selection   10/08/1998   ← 200
2. Transfers   Bank Account #: 00001122334455667
▷ 3. financial summary
4. Detail Corp # 444555666999 / SAMPLE CORPORATION Please select a line item for more detail:

| click here to download spreadsheet version of this data | | | |
|---|---|---|---|
| Financial Categories | Credits | Debits | Sub-Totals |
| DEPOSITS | | | |
| 1. VISA - DEPOSITS | 1,121.60 | | |
| | | | 1,121.60+ |
| | | Total: | 1,121.60+ |

202   Retrieve information on another merchant.

1. Date Selection   10/08/1998
2. Transfers   Bank Account #: 00001122334455667
3. Financial Summary   VISA -DEPOSITS
▷ 4. detail Corp # 444555666999 / SAMPLE CORPORATION

| 2 Items (1-2) | click here to download spreadsheet version of this data | | | |
|---|---|---|---|---|
| Merchant # | Date | Reference # | Description | Amount |
| 1. 367589201991 | 10/06/1998 | 480289975831 | VISA | 121.46+ |
| 2. 367589201991 | 10/05/1998 | 059378291764 | VISA | 1,000.14+ |
| | | | Total: | 1,121.60+ |

Retrieve information on another merchant.

FIG. 19

▷ 1. output options   ⟋ 220
   2. Spreadsheet

Corp # 444555666999 / SAMPLE CORPORATION

Please select among the following options to see monthly sales history:

Transfer Type: [Sales ans Credits] ─ 222
Card Type/Product Code: [All Cards] ─ 224

Period:  ● 3 Months
226 ⟋  ○ 6 Months
  ○ 12 Months
  ○ 18 Months

[Submit] ─ 228

Retrieve information on another merchant.

FIG. 20

1. <u>Output Options</u>  *Sales and Credits,*   ⟋ 230
   *All Cards, 3 Months*
▷ 2. spreadsheet Corp # 444555666999 / SAMPLE CORPORATION Sales History for the last 3 months:

| click here to download spreadsheet version of this data | | | |
|---|---|---|---|
| Month | Sales | Credits | Net |
| June, 1998 | 51,003.40 | 0.00 | 51,003.40 |
| May, 1998 | 60,022.18 | 25.26 | 59,996.92 |
| April, 1998 | 61,876.15 | 8.61 | 61,867.54 |
| Total: | 172,901.73 | 33.87 | 172,867.86 |

<u>Retrieve information on another merchant.</u>

FIG. 21

▷ 1. data/batch selection    ⟋ 240
   2. Query Results
   3. Product Summary
   4. Detail
   5. Draft Corp # 444555666999 / SAMPLE CORPORATION Please select a date range to see information on batch amounts submitted and processed:

From: [October] [01] [1998]  ⟋ 242
To:   [October] [08] [1998]  [Submit] ⟋ 246

Or, enter a batch reference number to see amounts submitted and processed:

[     ] [Submit] ⟋ 248
⟍ 244      <u>Retrieve information on another merchant.</u>

FIG. 22

1. Data/Batch Selection    10/01/1998 - 10/08/1998
▷ 2. query results
3. Product Summary
4. Detail
5. Draft

250

Corp # 444555666999 / SAMPLE CORPORATION

Please select a batch reference number for more detail:

| 7 Items (1-7) | | click here to download spreadsheet version of this data | | |
|---|---|---|---|---|
| | Batch Ref # | Submit Date | Terminal | All Cards | |
| | | | | Amount | Count |
| 1. | 177501000030 | 10/08/1998 | 00171 | 1,131.21+ | 16 |
| 2. | 177501000031 | 10/07/1998 | 00172 | 1,163.43+ | 7 |
| 3. | 177501000032 | 10/06/1998 | 00173 | 1,339.90+ | 9 |
| 4. | 177501000033 | 10/05/1998 | 00171 | 1,155.32+ | 4 |
| 5. | 177501000034 | 10/04/1998 | 00171 | 1,155.53+ | 5 |
| 6. | 177501000035 | 10/03/1998 | 00177 | 133.35+ | 2 |
| 7. | 177501000036 | 10/02/1998 | 00180 | 1,234.46+ | 6 |
| | | | Total: | 6,313.20+ | 38 |

252 points to row 1.

Retrieve information on another merchant.

1. Data/Batch Selection    10/01/1998 - 10/08/1998
2. Query Results    Batch Ref #: 177501000030
▷ 3. product summary
4. Detail
5. Draft Corp # 444555666999 / SAMPLE CORPORATION Please select a card for more detail:

| | 262 click here to download spreadsheet version of this data | | | |
|---|---|---|---|---|
| | Card | Amount | Count | Total |
| 1. | VISA | 748.63+ | 3 | 748.63+ |
| 2. | MASTERCARD | 382.58+ | 13 | 382.58+ |
| | Total: | 1,131.21+ | 16 | 1,131.21+ |

Retrieve information on another merchant.

FIG. 24

1. Data/Batch Selection   10/01/1998 - 10/08/1998
2. Query Results   Batch Ref # 177501000030  270
3. Product Summary   VISA
▷ 4. detail
5. Draft Corp # 444555666999 / SAMPLE CORPORATION Please select a card number to view all transactions conducted with that card:
Please select a reference number to view a detailed draft of that transaction:

| 3 Items (1-3) | | | | click here to download spreadsheet version of this data | |
|---|---|---|---|---|---|
| Card Type | Card # Cardholder Transaction Inquiry 274 | Date | Auth Code | Reference # Draft 272 | Amount |
| 1. VISA | 4271382110328891 | 10/08/1998 | 374983 | 24493988159200906665018 | 198.56+ |
| 2. VISA | 0328891427138211 | 10/08/1998 | 290372 | 29037229037229037229037 | 367.20+ |
| 3. VISA | 5500000000000005 | 10/08/1998 | 234235 | 23423523423523423523423 | 182.87+ |
| | | | | Total: | 748.63+ |

Retrieve information on another merchant.

FIG. 25

1. Date Selection   10/08/1998  300
▷ 2. query results

Corp # 444555666999 / SAMPLE CORPORATION

| 1 Item(s) (1-1) | | click here to download spreadsheet version of this data | | | | |
|---|---|---|---|---|---|---|
| CARD | Cardholder # | Transaction Amt. | Date | Type | Batch Reference # | |
| 1. AMERICAN EXPRESS | 00008392885661233347 | 120.00 | 10/08/1998 | SALE | 628443910956 | AUT |

Retrieve information on another merchant.

FIG. 28

▷ 1. account entry
2. Query Results   310
3. Draft

Corp # 444555666999 / SAMPLE CORPORATION

Please enter Cardholder Account Number to see a Transaction History for the past six months:

| 1234567890123456 | | Submit | 314

312

Retrieve information on another merchant.

FIG. 29

1. Data/Batch Selection
2. Query Results
3. Product Summary
4. Detail
▷ 5. draft

*10/01/1998 - 10/08/1998*
*Batch Ref # 177501000030*
*VISA*
*Ref # 24493988159200906665018*

Corp # 444555666999 / SAMPLE CORPORATION

| click here to download spreadsheet version of this data ||
|---|---|
| Outlet Number | 367589201991 |
| Outlet Name | #99 SAMPLE OUTLET |
| Cardholder Number | 4271382110328891 |
| Expiration Date | 06/01 |
| Transaction Amount | 198.56+ |
| Transaction Date | 10/02/1998 |
| Transaction Type | VISA |
| Entry Mode | Manual |
| Outgoing Reference Number | 24493988159200906665018 |
| BATCH ||
| Batch Reference Number | 177501000030 |
| Submit Date | 10/08/1998 |
| Submitted Batch Amount | 1,131.21+ |
| Processed Date | 10/08/1998 |
| Processed Amount | 1,131.21+ |
| INTERCHANGE ||
| Price Plan | Plan Code |
| Clear Plan | Plan Code |
| Transaction ID | 389209883271009 |

280

Retrieve information on another merchant.

FIG. 26

▷ 1. date selection
2. Query Results

290

Corp # 444555666999 / SAMPLE CORPORATION

Please select a date to see a Rejected Transactions List (max 6 months):

Date: [October] [08] [1998] [Submit] 294

292

Retrieve information on another merchant.

FIG. 27

1. account entry     Account #: 1234567890123456
▷ 2. query results                                    320
3. Draft Corp # 444555666999 / SAMPLE CORPORATION Please select a reference number to view a detailed draft of that transaction:

| 1 Item(s) (1-1) | | | | | click here to download spreadsheet version of this data | |
|---|---|---|---|---|---|---|
| Outlet # | Submit Date | Batch Ref # | Batch Date | Trans Type | Outgoing Ref # Draft | Trans Amount |
| 1. 367589201991 | 10/08/1998 | 177501000030 | 10/08/1998 | VISA | 24493988159200906665018 | 198.56+ |
| | | | | | Total: | 198.56+ |

Retrieve information on another merchant.    322

1. Account Entry     Account #: 1234567890123456
2. Query Results     Ref #: 24493988159200906665018
▷ 3. draft Corp # 444555666999 / SAMPLE CORPORATION

| click here to download spreadsheet version of this data | |
|---|---|
| DRAFT | |
| Outlet Number | 367589201991 |
| Outlet Name | #99 SAMPLE OUTLET |
| Cardholder Number | 1234567890123456 |
| Expiration Date | 06/01/1998 |
| Transaction Amount | 198.56+ |
| Transaction Date | 10/02/1998 |
| Transaction Type | VISA |
| Entry Mode | Manual |
| Outgoing Reference Number | 24493988159200906665018 |
| BATCH | |
| Batch Reference Number | 177501000030 |
| Submit Date | 10/08/1998 |
| Submitted Batch Amount | 1,131.21+ |
| Processed Date | 10/08/1998 |
| Processed Amount | 1,131.21+ |
| INTERCHANGE | |
| Price Plan | Plan Code |
| Clear Plan | Plan Code |
| Transaction ID | 389209883271009 |

Retrieve information on another merchant.

FIG. 31

▷ 1. date selection
   2. Outlet Statement     ← 340

---

Corp # 444555666999 / SAMPLE CORPORATION

Please select a statement date you would like to view from the date list below.
Note that these dates approximately reflect statements produced in the past 6 months.

| 09/08/1998 |
| --- |
| 08/09/1998 |
| 07/10/1998 |
| 06/10/1998 |
| 05/11/1998 |
| 04/11/1998 |

[Submit]  342

Your request might take a moment to process, please press the button only once.

<u>Retrieve information on another merchant.</u>

▷ 1. output options
   2. Query Results
   3. Detail     ← 360

---

Corp # 444555666999 / SAMPLE CORPORATION

Please select among the following options to see chargeback information  362

CB Reason Code: | All Codes |

From: | April | | 08 | | 1998 |

To: | October | | 08 | | 1998 |

Chargeback ● All Types — 366   364
Status:    Outstanding
           Reversed
           Expired

[Submit]

<u>Retrieve information on another merchant.</u>

FIG. 34

1. Date Selection  Statement Ending- 09/08/1998
▷ 2. outlet statement

*← 350*

Corp # 999999999999 / SAMPLE CORPORATION

Tips for Printing

P.O. Box 6600
HAGERSTOWN, MD 21740-6600

END OF MONTH STATEMENT    MAY 1, 1997    MAY 31, 1997

| SUBMITTED | REFERENCE | ---------- SUBMITTED DEPOSITS: SALES | |
|---|---|---|---|
| 05/01/97 | 551869010257 | | |
| | MASTERCARD | 11,255.55 | DISCOVER |
| | VISA | 17,602.23 | AMERICAN EXP |
| | SUBTOTAL | 28,857.78 | |
| | | | |
| 05/31/97 | 551870310354 | | |
| | MASTERCARD | 909.68 | DISCOVER |
| | VISA | 213.72 | |
| | SUBTOTAL | 1,123.040 | |
| | | | |
| | TOTAL | | |
| | MASTERCARD | 237,356.01 | DISCOVER |
| | VISA | 497,584.87 | AMERICAN EXP |
| | SUBTOTAL | 734,940.88 | |

| SUBMITTED | REFERENCE | ---------- DISCOUNT & ADJUSTMENTS --- | |
|---|---|---|---|
| 05/01/97 | 551869010257 | DISCOUNT MASTERCARD | DEPOSITS |
| 05/02/97 | 551870020124 | DISCOUNT VISA | DEPOSITS |
| | | | |
| 05/30/97 | 551870300323 | DISCOUNT VISA | DEPOSITS |
| 05/31/97 | 551870310354 | DISCOUNT VISA | DEPOSITS |
| | | | |
| 05/02/97 | 152543020303 | ADJUSTMENT FOR AMERICAN EXPRESS DEPOSIT | |
| 05/03/97 | 516089030357 | ADJUSTMENT FOR AMERICAN EXPRESS DEPOSIT | |
| 04/30/97 | 000000309800 | APR EXCEEDED TIMELINESS | |
| 04/30/97 | 000000309800 | APR INCORRECT POS CODES | |
| | | | |
| 04/30/97 | 000000309800 | APR TRANSACTION CLEARED AS CORP T&E (US) BUSINESS | |
| 05/31/97 | 000000000000 | DISCOVER LOCAL AUTH FEE | 186 TRANSACTIONS AT .07 |
| 05/31/97 | 000000000000 | DISCOVER WATS AUTH FEE | 13 TRANSACTIONS AT .070 |
| 05/31/97 | 000000000000 | DISCOVER EDC CAPTURE FEE | 156 TRANSACTIONS AT .0 |
| 05/31/97 | 000000000000 | MC FOREIGN HANDLING FEE | .001000 BASIS PTS TIMES $ |
| 05/31/97 | 000000000000 | VISA FOREIGN HANDLING FEE | .001000 BASIS PTS TIMES |
| | | TOTAL DISCOUNT & ADJUSTMENTS | |

---------- STATEMENT SUMMARY ------
SUBMITTED DEPOSITS, DISCOUNT & ADJUSTMENTS, CHARGEBACKS & REVERSALS 744,653.89

| DATE | REFERENCE | - - - - - - - - - - - CHECKING ACCOUNT TRANSFER - - |
|---|---|---|
| 05/01/97 | 141946000000DEPOSIT | TOTAL FOR 05/0 |
| 05/02/97 | 154317000000DEPOSIT | TOTAL FOR 05/0 |
| 05/05/97 | 125400000000DEPOSIT | TOTAL FOR 05/0 |
| 05/06/97 | 115612000000DEPOSIT | TOTAL FOR 05/0 |
| 05/07/97 | 113736000000DEPOSIT | TOTAL FOR 05/0 |
| 05/08/97 | 115147000000DEPOSIT | TOTAL FOR 05/0 |
| 05/09/97 | 112248000000DEPOSIT | TOTAL FOR 05/0 |
| 05/22/97 | 105958000000DEPOSIT | TOTAL FOR 05/2 |
| 05/23/97 | 105411000000DEPOSIT | TOTAL FOR 05/2 |
| 05/27/97 | 112644000000DEPOSIT | TOTAL FOR 05/2 |
| 05/28/97 | 105936000000DEPOSIT | TOTAL FOR 05/2 |
| 05/29/97 | 143725000000DEPOSIT | TOTAL FOR 05/2 |
| 05/30/97 | 150201000000DEPOSIT | TOTAL FOR 05/3 |

- - - - - - - - - - - - - - - - - - - - - - - - - - - DEPOSIT RECAP - - - - - - - - - - -

| | - - - - SALES - - - - | | - - - - CREDITS - - - - | | - - - NET SALES - - - | |
|---|---|---|---|---|---|---|
| CARD TYPE | TICKETS | AMOUNT | TICKETS | AMOUNT | TICKETS | AMOUNT |
| MASTERCARD | 1,277 | 268,625.04 | 165 | 31,269.03 | 1,112 | 237,356. |
| VISA | 2,172 | 567,652.21 | 284 | 70,067.34 | 1,888 | 496,584. |
| DISCOVER | 141 | 28,091.32 | 23 | 3,768.77 | 118 | 24,322.. |
| DINERS | 141 | 28,561.25 | 9 | 2,157.30 | 132 | 26,403. |
| AMERICAN EX | 2,393 | 928,995.52 | 309 | 76,160.19 | 2,084 | 852,835. |
| TOTAL | 6,124 | 1,821,925.34 | 790 | 183,422.63 | 15,334 | 1,638,502. |

Retrieve information on another merchant.

FIG. 33B

1. Output Options     ALL CODES, un/de/fine - un/de/fine, ALL TYPES     370
▷ 2. query results
3. Detail Corp # 444555666999 / SAMPLE CORPORATION Please select a line item for more detail:

| OUTSTANDING | | | | | |
|---|---|---|---|---|---|
| 1 Items (1-1) | | | click here to download spreadsheet version of this data | | |
| Item # | Cardholder # | Trans Date | Amount | Chargeback RSN | Notification Date |
| 1. | 5892857489218394 | 10/08/1998 | 124.50 | DUPLICATE PROCESSING | 10/02/1998 |
| | | Total Amount: | 124.50 | | |

372

Please select a line item for more detail:

| EXPIRED | | | | | |
|---|---|---|---|---|---|
| 5 Items (1-5) | | | click here to download spreadsheet version of this data | | |
| Item # | Cardholder # | Trans Date | Amount | Chargeback RSN | Notification Date |
| 1. | 0785039485732122 | 06/06/1998 | 141.16 | NON-MATCHING ACCOUNT NUMBER | 06/22/1998 |
| 2. | 8397445673928741 | 04/21/1998 | 132.11 | DUPLICATE PROCESSING | 07/01/1998 |
| 3. | 5900958477787323 | 06/20/1998 | 1,205.41 | NO SIGNATURE | 07/20/1998 |
| 4. | 4458499709621954 | 06/20/1998 | 1,256.97 | NO SIGNATURE | 07/22/1998 |
| 5. | 5542937264997868 | 05/11/1998 | 163.47 | NO RECEIPT OF REQUESTED ITEM | 08/24/1998 |
| | | Total Amount: | 2,899.12 | | |

| REVERSED | | |
|---|---|---|
| 0 Items | | click here to download spreadsheet version of this data |
| | Total Amount: | 0.00 |

Grand Total: 3,023.62

<u>Retrieve information on another merchant.</u>

FIG. 35

1. Output Options    ALL CODE OUTSTANDING   380
2. Query Results    Card # 5892857489218394
▷ 3. detail Corp # 444555666999 / SAMPLE CORPORATION

| click here to download spreadsheet version of this data | |
|---|---|
| Original Number | 124.50 |
| Chargeback Number: | 124.50 |
| Transaction Date: | 08/13/1998 |
| Outgoing Reference Number: | 000076500070196911014902426657 |
| Transaction Type: | SALE |
| Chargeback Control #: | 112512705036 |
| Issuer Bank #: | 143311 |
| Chargeback Entry Mode: | ISSUER |
| Category Code: | 5334 |
| Authorization Code: | 665753 |

| Received On | Reversed By | Chargeback Reason | Message from Issuing Bank | Disposition |
|---|---|---|---|---|
| 10/02/1998 | 10/14/1998 | DUPLICATE PROCESSING | DOC TO FOLLOW | 10/02/1998 |

Retrieve information on another merchant.

FIG. 36

▷ 1. output options    390
   2. Spreadsheet

Corp # 444555666999 / SAMPLE CORPORATION

Please select among the following options to see chargebackstatistics for a selected month or for a 6 month period:

CB Reason Code: | All Codes |   392
Month: | October | 394
Card Type: | Both Cards | 396

[ Submit ]

Retrieve information on another merchant.

FIG. 37

1. Output Options    ALL CODES
▷ 2. spreadsheet                        ╱ 400

Corp # 444555666999 / SAMPLE CORPORATION

| | | Chargebacks | | | Reversals | | | Totals | |
|---|---|---|---|---|---|---|---|---|---|
| *1 Items (1-1)* | | \multicolumn{7}{c}{click here to download spreadsheet version of this data} | | |
| | CB Reason | Count | Amount | % | Count | Amount | % | Count | Amount |
| 1. | NON-RECEIPT OF MERCHANDISE | 290 | 5,812.29 | 94 | 20 | 715.62 | 6 | 310 | 6,527.91 |
| 2. | NON-RECEIPT OF REQUESTED ITEM | 0 | 0.00 | 0 | 0 | 0.00 | 0 | 0 | 0.00 |
| 3. | REQUESTED ITEM ILLEGIBLE | 0 | 0.00 | 0 | 0 | 0.00 | 0 | 0 | 0.00 |
| 4. | NON-MATCHING ACCOUNT NUMBER | 10 | 7.84 | 100 | 0 | 0.00 | 0 | 10 | 7.84 |
| 5. | DUPLICATE PROCESSING | 0 | 0.00 | 0 | 0 | 0.00 | 0 | 0 | 0.00 |
| 6. | INCCORECT ACCOUNT NUMBER | 0 | 0.00 | 0 | 0 | 0.00 | 0 | 0 | 0.00 |
| 7. | IMPRINTING OF MULTIPLE DRAFTS | 0 | 0.00 | 0 | 0 | 0.00 | 0 | 0 | 0.00 |
| 8. | MAIL/TELEPHONE OR UNIQUE ORDER TRANS UNAUTHORIZED PURCHASER | 20 | 599.86 | 67 | 10 | 565.00 | 33 | 30 | 1,164.86 |
| ⋮ | | | | | | | | | |
| 23. | MAIL/PHONE ORDER, RECURRING, PREAUTHORIZED HEALTH CARE, OR MAGNETIC STRIPE READING PHONE TRANSACTION - UNAUTHORIZED PURCHASER | 80 | 3,132.73 | 100 | 0 | 0.00 | 0 | 80 | 3,132.73 |
| 24. | NON-MATCHING ACCOUNT NUMBER/TRAVEL VOUCHER NUMBER | 0 | 0.00 | 0 | 0 | 0.00 | 0 | 0 | 0.00 |
| 25. | NON-RECEIPT OF REQUESTED ITEM | 20 | 130.00 | 100 | 0 | 0.00 | 0 | 20 | 130.00 |
| 26. | DUPLICATE PROCESSING | 0 | 0.00 | 0 | 0 | 0.00 | 0 | 0 | 0.00 |
| 27. | CREDIT NOT PROCESSED | 160 | 2,762.51 | 100 | 0 | 0.00 | 0 | 160 | 2,762.51 |
| | Total: | 1270 | 28,231.98 | | 60 | 1,685.99 | | 1330 | 29,917.97 |

Retrieve information on another merchant.

FIG. 38

▷ 1. account entry
2. Query Results
3. Detail
       410

Corp # 444555666999 / SAMPLE CORPORATION

Please enter Cardholder Account Number to see Chargeback Detail:

| 1234567891011121 | | Submit |
412

Retrieve information on another merchant.

FIG. 39

1. Account Entry         Card # 1234567891011121   420
▷ 2. query results
3. Detail Corp # 444555666999 / SAMPLE CORPORATION

| 2 Item(s) | click here to download spreadsheet version of this data | |
|---|---|---|
| | Date | Amount |
| 1. | 09/24/1998 | 1,700.00 |
| 2. | 08/02/1998 | 1,700.00 |

422      Retrieve information on another merchant.

FIG. 40

▷ 1. output options     440
2. Query Results

Corp # 444555666999 / SAMPLE CORPORATION

Please select among the following options to see a media retrieval list:  442

From: | April | | 08 | | 1998 |
To:   | October | | 08 | | 1998 |

Retrieval Type:  ⦿ All Types          ○ Chargeback Outstanding
444        ○ Outstanding         ○ Chargeback Reversed
           ○ Reversed            ○ Chargeback Expired
           ○ Expired

| Submit |

Retrieve information on another merchant.

FIG. 42

1. Account Entry   Card # *1234567891011121*  *430*
2. Query Results  *09/24/1998*
▷ 3. detail Corp # 444555666999 / SAMPLE CORPORATION

| click here to download spreadsheet version of this data | |
|---|---|
| Original Amount: | 1,700.00 |
| Chargeback Amount: | 1,700.00 |
| Transaction Date: | 09/24/1998 |
| Outgoing Reference Number: | 00000002420655151627158692 4642 |
| Transaction Type: | SALE |
| Chargeback Control #: | 201167710062 |
| Issuer Bank #: | 560422 |
| Chargeback Entry Mode: | Manual |
| Category Code: | 7022 |
| Authorization Code: | 778601 |
| Received On: | 09/24/1998 |
| Reverse: | 09/24/1998 |
| Incoming Chargeback Reason: | INVALID T&E TRANSACTION |
| Message from Issuing Bank: | 05 UNAUTH TRANS |

Retrieve information on another merchant.

FIG. 41

▷ 1. spreadsheet   *460*

Corp # 444555666999 / SAMPLE CORPORATION

Media Retrieval Statistics for a 6 month period:

| click here to download spreadsheet version of this data | | | | |
|---|---|---|---|---|
|  | Fulfilled | Unfulfilled | Expired | Total |
| Number of Items | 10 | 1 | 12 | 23 |
| Percentage of Total: | 43 | 4 | 52 | 100 |

Retrieve information on another merchant.

FIG. 44

1. Output Options  04/08/1998 - 10/08/1998
   *All Types*
▷ 2. query results      ← 450

---

Corp # 444555666999 / SAMPLE CORPORATION

Please select a line item for more detail:

| Outstanding Only | | | | | |
|---|---|---|---|---|---|
| *3 Items (1-3)* | | click here to download spreadsheet version of this data | | | |
| Item # | Outlet # | Cardholder # | Transaction Date | Document Locator | Amount |
| 1. | 367589201991 | 5892857489218394 | 08/28/1998 | 60814826 | 110.53 |
| 2. | 367589202991 | 4492673342159786 | 09/19/1998 | 68152095 | 1,209.65 |
| 3. | 367589201991 | 9950936007867584 | 09/19/1998 | 82609154 | 1,456.08 |
| | | | | Total Amount: | 2,776.26 |

| Reversed Only | |
|---|---|
| *0 Items* | click here to download spreadsheet version of this data |
| | Total Amount:  0.00 |

| Expired Only | | | | | |
|---|---|---|---|---|---|
| *1 Items (1-1)* | | click here to download spreadsheet version of this data | | | |
| Item # | Outlet # | Cardholder # | Transaction Date | Document Locator | Amount |
| 1. | 367589209991 | 5984902748227164 | 08/01/1998 | 46108138 | 1,334.36 |
| | | | | Total Amount: | 1,334.36 |

| Chargeback Outstanding Only | |
|---|---|
| *0 Items* | click here to download spreadsheet version of this data |
| | Total Amount:  0.00 |

| Chargeback Reversed Only | |
|---|---|
| *0 Items* | click here to download spreadsheet version of this data |
| | Total Amount:  0.00 |

| Chargeback Expired Only | |
|---|---|
| *0 Items* | click here to download spreadsheet version of this data |
| | Total Amount:  0.00 |

Grand Total:   4,110.62

Retrieve information on another merchant.

FIG. 43

METHOD FOR PROVIDING BANK CARD TRANSACTION DATA

TECHNICAL FIELD

The present invention relates generally to providing credit card account and transaction information via the Internet.

BACKGROUND ART

Merchants require access to bank card transaction data such as funding and charge back information. Funding information includes what was funded to a merchant account over a given time interval. A charge back is a returned transaction resulting from the lack of adherence to the conditions of a sales agreement, association regulations, or operating procedures. A corresponding merchant account is debited in response to a charge back. What is needed is an improved method for use with the Internet for providing bank card transaction data to merchants.

SUMMARY OF THE INVENTION

Accordingly, it is an object of the present invention to provide a method for use on the Internet which provides merchants with access to bank card transaction data including funding and charge back information.

In carrying out the above object and other objects, the present invention provides a method of providing bank transaction data for a merchant via the Internet. The method includes displaying on a computer connected to a host graphical user interface having a plurality of payment services categories. Each of the payment services categories is associated with a processing function performed by the host. One of the payment services categories is then selected. A graphical user interface having links associated with the selected one of the payment services categories is then displayed on the computer. One of the links is then selected. A graphical user interface having entry boxes associated with the selected one of the links is then displayed on the computer. Requested information is then entered into the entry boxes. The requested information entered into the entry boxes is then processed at the host. A graphical user interface having bank card transaction data associated with the processed requested information is then displayed on the computer.

The advantages accruing to the present invention are numerous. For instance, the method provides an all-in-one suite of account management tools for reconciling accounts, obtaining reports, analyzing trends, researching transactions, tracking and auditing transactions, and managing charge backs.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a flow diagram representing operation of the method and system of the present invention is shown;

FIG. 2 is a block diagram of a system for carrying out the method of the present invention;

FIGS. 3–6 illustrate graphical user interfaces (GUI) used for the enrollment process of the method of the present invention;

FIG. 7 illustrates a GUI for entering a user identification number and a password;

FIG. 8 illustrates a GUI for entering a merchant account number;

FIG. 9 illustrates a GUI for selecting a merchant from a list;

FIG. 10 illustrates a payment services GUI;

FIGS. 11–15 illustrate GUIs associated with the funding information function;

FIGS. 16–19 illustrate GUIs associated with the daily funding information function;

FIGS. 20–21 illustrate GUIs associated with the monthly sales history function;

FIGS. 22–26 illustrate GUIs associated with the point of sale information function;

FIGS. 27–28 illustrate GUIs associated with the rejected transactions list function;

FIGS. 29–31 illustrate GUIs associated with the cardholder transaction inquiry function;

FIGS. 32–33 illustrate GUIs associated with the outlet statements function;

FIGS. 34–36 illustrate GUIs associated with the chargeback list function;

FIGS. 37–38 illustrate GUIs associated with the chargeback statistics function;

FIGS. 39–41 illustrate GUIs associated with the cardholder chargeback detail function;

FIGS. 42–43 illustrate GUIs associated with the media retrieval list function; and FIG. 44 illustrates a GUI associated with the media retrieval statistics function.

BEST MODES FOR CARRYING OUT THE INVENTION

Figures 1, 2, 3, 4:
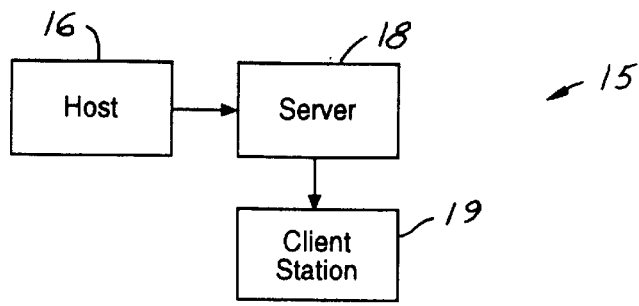

Referring now to FIG. 1, a flow diagram 10 representing operation of the method and system of the present invention is shown. Initially, a user such as a merchant selects the bank card transaction data for the merchant to be viewed as shown in block 12. A custom report of transaction data is then created for the merchant to view as shown in block 14.

Referring now to FIG. 2, a system 15 for carrying out the method of the present invention is shown. System 15 includes a host 16, a server 18, and a merchant client station (personal computer) 19. Host 16 compiles transaction data information of merchants into a plurality of processing functions. Host 16 then routes the reports to server 18. The merchant user at computer 19 can then gain access to the reports from server 18 over the Internet using a web browser.

To access the bank card transaction data on server 18 from computer 19, a merchant needs to have a user identification number, a password, and a personal certificate. These are assigned during the enrollment process. Referring now to FIG. 3–6, to begin the enrollment process a graphical user interface (GUI) 20 is initially displayed on computer 19 for the merchant to view. GUI 20 includes information entry boxes 22 for receiving merchant identification information such as first name, last name, personal identification number (PIN), merchant number, bank account number, telephone number, and email address. After the merchant enters this information, host 16 receives and processes the information to assign a user identification number and a password. A GUI 30 is then displayed on computer 19 which includes a user identification number 32 and a password 34. GUIs 40 and 50 are then displayed on computer 19 for the merchant to receive a personal certificate.

Referring now to FIG. 7, the merchant can then access the bank card transaction data and skip the enrollment process by entering the user identification number and password in the entry boxes 62 and 64 of GUI 60. Upon entry of a valid identification number and password, an outlet search criteria GUI 70 having merchant number and name entry boxes 72 and 74 is then displayed as shown in FIG. 8. The merchant may then enter information into entry boxes 72 and 74 to have access to bank card transaction data of a specific outlet or a range of outlets belonging to the merchant. As shown in FIG. 9, a GUI 80 returns the results of the search initiated on outlet search criteria GUI 70. The merchant may now select the (or one of the) merchant outlet(s) returned. Once an outlet is chosen, the merchant's chaining information is recorded and a drill-down path is established. Note that a different outlet may be searched for and chosen clicking the "Retrieve information on another merchant" link 82. The merchant may also click the "Merchant #" link 84 to continue.

Referring now to FIG. 10, a payment services GUI 90 is then displayed on computer 19. From GUI 90, the merchant may analyze their electronic credit card transactions. GUI 90 includes four main categories: sales & funding 92, reports 94, chargebacks 96, and media retrieval 98. Sales & funding category 92 includes six core processing functions as indicated by funding information link 98, daily funding information link 100, monthly sale history link 102, point of sale information link 104, rejected transactions list link 106, and cardholder transaction inquiry link 108. Reports category 94 includes one processing function as indicated by outlet statements link 110. Chargebacks category 96 includes three processing functions as indicated by chargeback list link 112, chargeback statistics link 114, and cardholder chargeback detail link 116. Media retrieval category 98 includes two core processing functions as indicated by media retrieval list link 118 and media retrieval statistics link 120.

Referring now to FIGS. 11–15, the funding information function is described in further detail. The funding information function details what was funded to any one of the checking accounts of the merchant over a specified time interval. Initially, upon clicking funding information link 98, an account selection GUI 130 is displayed for the merchant to select an account to view the funding information. A date selection GUI 140 is then displayed for the merchant to select a date range to examine. After an account and a date range have been selected, a transfers GUI 150 displays all of the funding transfers matching the given criteria. A financial summary GUI 160 then displays a summary of the funding transfers and a detail GUI 170 displays a detail of the funding transfers.

Referring now to FIGS. 16–19, the daily funding information function is described in further detail. The daily funding information function details what was funded t o all of the accounts of the merchant on a specific date. Upon clicking daily funding information link 100, a date selection GI 180 displays entry boxes for the merchant to select a date to view the daily funding information. A transfers GI 190 then displays all of the accounts with activity on the selected date and amount totals. The merchant may then click a "Bank Account #" link 192 to obtain further information for the selected account. A financial summary GUI 200 then displays a summary of the activity for the selected account on the specified date. The merchant may then click a "Financial Categories" link 202 to obtain further information for the selected financial category. A detail GUI 210 then displays a detail of the specific funding category.

Referring now to FIGS. 20–21, the monthly sales history function is described in further detail. The monthly sales history function tracks retail credit card activity and performance by card type over time. Upon clicking monthly sales history link 102, an output options GUI 220 displays transfer type entry box 222, card type entry box 224, and time period radio buttons 226 for the merchant to enter information. The merchant then clicks "submit" button 228 to continue. A spreadsheet GIU 230 then creates a report displaying information based on the criteria selected in output options GUI 220.

Referring now to FIGS. 22–26, the point of sale information function is described in further detail. The point of sale information function shows all point of sale card transactions by batch based on submitted deposits. A batch is typically a day's worth of transactions including sales and credits to be processed. Upon clicking point of sale information link 104, a date/batch selection GUI 240 displays date entry boxes 242 and a batch reference number entry box 244 for the merchant to enter information. The merchant may either select multiple batches within a specified date range or search for a specified batch. The merchant may then click either of "submit" buttons 246 or 248 to continue. A query results GUI 250 then displays, in response to a selected date range, all of the batches processed during the specified time period, totaling the amounts and counts for those batches. The merchant may then click the "Batch Ref #" link 252 to continue with a selected batch reference number. A product summary GUI 260 then summarizes the batch by card type, totaling the amounts and counts for those card types. The merchant may then click "Card" link 262 to obtain more information for the card. A detail GUI 270 then displays more detailed information about the transactions of the selected card type, totaling the amounts. The merchant may then click "Reference #" link 272 to continue on to the draft page or click "Card #" link 274 to display all of the transactions associated with that card number. A draft GUI 280 displays a detailed draft of the selected transaction in response to a selected reference number.

Referring now to FIGS. 27–28, the rejected transactions list function is described in further detail. The rejected transactions list function provides a list of rejected transactions, along with reason codes which explain why they were rejected. Upon clicking rejected transactions list link 106, a date selection GUI 290 displays date entry boxes 292 for the merchant to select a date to examine. After a date has been entered and the merchant has clicked "submit" button 294, a query results GUI 300 displays all of the rejected transactions for the date selected, including the cardholder's account number, amount, type of transaction, the reason for the rejection, and a reference number.

Referring now to FIGS. 29–31, the cardholder transaction inquiry function is described in further detail. The cardholder transaction inquiry function provides a list of all the transactions associated with a specific cardholder's account number. Upon clicking cardholder transaction inquiry link 108, an account entry GUI 310 displays an entry box 312 for the merchant to enter an account number. After an account has been entered and the merchant has clicked "submit" button 314, a query results GUI 320 displays all of the transactions associated with the specified cardholder account number for a given past time period. The merchant may then click "Outgoing Ref #" link 322 to select a reference number. A draft GUI 330 then displays a detailed draft of the selected transaction in response to the selected reference number.

Referring now to FIGS. 32 and 33(A–B), the outlet statement function is described in further detail. The outlet statement function provides electronic copies of statements. Upon clicking outlet statement function link 110, a date selection GUI 340 displays an entry box 342 for the merchant to select a statement date. Upon selecting a statement date, an outlet statement 350 displays a general summary of all the transactions for the selected date divided among several sections. These sections include daily deposits by card brand with running totals, daily discounts, adjustments, fees by brand, account transfers by business day, and several summaries of the above data in short form.

Referring now to FIGS. 34–36, the chargeback list function is described in further detail. The chargeback list function provides basic information on chargebacks (disputed transactions by cardholders) for outstanding, reversed, and expired chargebacks. This is important because of the strict rules of bank card associations about responding in a timely fashion to transaction disputes. Upon clicking chargeback list function link 112, an output options GUI 360 displays reason code entry box 362, date entry box 364, and chargeback status entry box 366 for the merchant to select a reason code, date range, and status, respectively. A query results GUI 370 then displays those chargebacks matching the selected criteria. The merchant may then click "Cardholder #" link 372 for the merchant to select a cardholder number. A detail GUI 380 then displays a detail of the particular chargeback in response to the selected cardholder number.

Referring now to FIGS. 37–38, the chargeback statistics function is described in further detail. The chargeback statistics function provides basic statistical information on chargebacks outstanding, reversed, and expired. Upon clicking chargeback statistics function link 114, an output options GUI 390 displays reason code entry box 392, month entry box 394, and card type entry box 396 for the merchant to select a reason code, month, and card type, respectively. A spreadsheet GUI 400 then displays all of the chargebacks grouped by reason code, with count and amount totals in response to the selected criteria.

Referring now to FIGS. 39–41, the cardholder chargeback detail function is described in further detail. The cardholder chargeback detail function provides merchants with the ability to query by cardholder number for a specific chargeback of record for investigative reasons. Upon clicking cardholder chargeback detail function link 116, an account entry GUI 410 displays a cardholder account number entry box 412 for the merchant to select an account number. A query results GUI 420 displays all of the chargebacks for the selected cardholder account number grouped by date. The merchant may then click "Date" link 422 to select a date for the chargebacks. A detail GUI 430 then displays a detail of the selected chargeback in response to the selected date.

Referring now to FIGS. 42–43, the media retrieval list function is described in further detail. The media retrieval list function provides basic information on media retrieval requests, which are closely associated with chargebacks. Media retrievals (i.e., credit proof of purchase receipts) are used by merchants and their credit card processors to substantiate "proof of purchase" by cardholders for disputed transactions(s). Media retrieval lists provide outstanding, reversed, and expired requests which are important because of the strict bank card association rules in regards to responding to transaction disputes.

Upon clicking media retrieval list link 118, an output options GUI 440 displays a date entry box 442 and a retrieval type list 444 for the merchant to select a date range and retrieval type. A query results GUI 450 displays all of the media retrievals grouped by type, with amount totals and a document locator number. The document locator number is assigned to the original paperwork and can be used to access that file.

Referring now to FIG. 44, the media retrieval statistics function is described in further detail. The media retrieval statistics function provides basic statistical information on media retrieval requests such as fulfilled, unfulfilled, and expired. Upon clicking media retrieval statistics link 120, a spreadsheet GUI 460 displays the basic media retrieval statistics.

In addition to payment services GUI 90, a banking tools & information GUI and a news & resources GUI may also be displayed on computer 19 (not specifically shown). The banking tools & information GUI is where the merchant can find information concerning and provided by the sponsoring bank for inquiries, fund transfers, credit, and investment product information. News & resources GUI is where the merchant can find resources, tools, and news.

Thus it is apparent that there has been provided, in accordance with the present invention, a method of providing bank card transaction data for a merchant via the Internet that fully satisfies the objects, aims, and advantages set forth above.

While the present invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

What is claimed is:

1. A method of providing bank transaction data for a merchant via the Internet, the method comprising:

compiling bank transaction data for merchants into a plurality of processing functions at a host;

routing the bank transaction data for the merchants from the host to a server operable with the Internet;

displaying on a client station connected to the server via the Internet a graphical user interface having a plurality of payment services categories, wherein each of the payment services categories is associated with a processing function performed by the host, wherein the payment services categories include a sales & funding category, a chargebacks category, and a media retrieval category;

selecting one of the payment services categories using the client station;

displaying on the client station a graphical user interface having links associated with the selected one of the payment services categories, wherein the sales & funding category includes a funding information link, the chargebacks category includes a chargeback list link, and the media retrieval category includes a media retrieval list link;

selecting one of the links using the client station;

displaying on the client station a graphical user interface having entry boxes associated with the selected one of the links;

entering requested information into the entry boxes;

processing at the host the bank transaction data in response to the requested information entered into the entry boxes; and displaying on the client station a graphical user interface having bank card transaction data associated with the requested information.

* * * * *